(12) United States Patent
Lew

(10) Patent No.: US 12,061,645 B2
(45) Date of Patent: Aug. 13, 2024

(54) METHOD FOR CREATING AN ALBUM BY AUTO POPULATING IN REAL TIME BY AN APPLICATION AND SYSTEM THEREOF

(71) Applicant: Grace Lew, Encino, CA (US)

(72) Inventor: Grace Lew, Encino, CA (US)

(*) Notice: Subject to any disclaimer, the term of this patent is extended or adjusted under 35 U.S.C. 154(b) by 268 days.

(21) Appl. No.: 17/528,495

(22) Filed: Nov. 17, 2021

(65) Prior Publication Data

US 2022/0075818 A1 Mar. 10, 2022

Related U.S. Application Data

(63) Continuation-in-part of application No. 16/402,628, filed on May 3, 2019, now abandoned.

(51) Int. Cl.
| | |
|---|---|
| H04N 1/00 | (2006.01) |
| G06F 16/55 | (2019.01) |
| G06F 16/58 | (2019.01) |
| G06F 16/587 | (2019.01) |

(52) U.S. Cl.
CPC .......... *G06F 16/5866* (2019.01); *G06F 16/55* (2019.01); *G06F 16/587* (2019.01); *H04N 1/00196* (2013.01)

(58) Field of Classification Search
CPC .... G06F 16/5866; G06F 16/55; G06F 16/587; H04N 1/00196
See application file for complete search history.

(56) References Cited

U.S. PATENT DOCUMENTS

| | | | | |
|---|---|---|---|---|
| 8,760,532 | B2* | 6/2014 | Iwasaki | H04N 1/00453 348/222.1 |
| 8,923,551 | B1* | 12/2014 | Grosz | H04L 67/12 715/202 |
| 2010/0063961 | A1* | 3/2010 | Guiheneuf | G06F 16/58 707/E17.046 |
| 2013/0117365 | A1* | 5/2013 | Padmanabhan | H04L 67/10 709/204 |
| 2013/0167086 | A1* | 6/2013 | Kim | G06F 3/0481 715/810 |
| 2014/0198986 | A1* | 7/2014 | Marchesotti | G06K 9/6255 382/190 |
| 2015/0153918 | A1* | 6/2015 | Chen | G06F 16/22 715/771 |

* cited by examiner

*Primary Examiner* — Haoshian Shih
(74) *Attorney, Agent, or Firm* — Fei Hung Yang

(57) ABSTRACT

The present application discloses a method for creating an album in real-time by an application, once selecting the titled album; entering camera mode in the application. Text function bar shown within camera mode; ability to contribute personalized text entry while in camera mode before and after captured if needed; capturing the at least one media. Photo, video or text entry, via the application; showing the at least one media with text entries by the application; and automatically, self-populating, in real time, directly into selected album. All entries will have date and time under each entry to ensure the accuracy. In addition, application allows user to invite additional contributors to contribute and capture directly, into the same album at the same time. When the album is finalized, the album may automatically include date of the first and last entry on cover and spine of album, alongside the title.

17 Claims, 20 Drawing Sheets

Ability to invite others from your contacts to contribute and populate to the same album as the moment is happening and being captured.

Text Bar is Part of the phones camera. Now you can capture photos, videos and now text entries allowing for instant text entry to your album.

METHOD FOR CREATING AN ALBUM BY AUTO POPULATING IN REAL TIME BY AN APPLICATION AND SYSTEM THEREOF

FIELD OF THE INVENTION

The present application generally relates to software applications, and more particularly, to a method for automatically creating an album by an application. Specifically, no more manual selecting and then uploading required like all other album creating applications. The present application may populate the selected album with photo, video and/or personalized text entries automatically and directly into selected album instantly as the user takes them.

BACKGROUND OF THE INVENTION

Traditional mobile apps that allow users to create albums with their photos taken by their phone have been a time-consuming process and limited in its functionality. With the advancement of technology, the methods in recent years allow users to populate their album after the event or moment has happened. However, the user must go into his or her library, select the photos and the send or upload to the selected album. Some processes have streamlined the process by clustering photos by theme or meta data pertaining to a specific event, location or day, date and time. This is limiting and creating parameters that could cause loss of images or exclusion of images. Those methods also limit to just photos and does not include personalized text entries and video to populate all together and in real-time as the moment or event is being captured, directly going into the selected album and creating as the user capture. Although those methods allow users to include text entries after the moment has happened, sentiment has happened, which means the text entries cannot be entered during the recording video or photo taking process. The applications nowadays also limit the user's ability to populate their album in real-time and they must request and have shared images and photos be sent to their device or upload to the same location after the moment or event has been captured. Another limitation with these applications is they are created for users to then order printed albums which only contain photos, and text entries and videos are not included. Current application has created a method allowing user to create a digital album in real-time that included photos, videos and personalized text entries.

Recently, due to the wide-spread use and reliance of mobile devices such as a smartphone or tablet, it has become common for a user to capture and store photos, videos on such mobile devices. There are current album making and cloud-based programs to help you create and or store your photos and videos captured on you cell phone.

However, these programs have various drawbacks. The main drawback is that the album does not self-populate in real-time and or in an organized manner. The user must select images after the fact and then upload to a server or selected album, to select and upload after the event or moment has happened. Another drawback is personalized text entries are also after the moment, thought, sentiment has happened, which means the text entries cannot be entered while recording video or before the picture is captured. And, text entries are saved in separate cloud and or storage space separate from your photos and videos, thus meaning proper organized documenting is not as thorough and complete and organized a process. Also on other applications, you have to rely on Air dropping or requesting others to select and send photos not take by you, but was at the same event, traveling or celebrating alongside you and others, in order to receive photos or video you might want.

And again, text entries in other methods are only available after the moment or event had happened. As time had passed, you may have forgotten those thoughts, milestones, meaningful sentiments you would have loved to put next to your image or Video but the moment has passed and you have forgotten, the mood or feeling is no longer there or it's too time consuming.

The current methods and systems for digitally preserving personal and family history are deficient for several reasons. First, the user must find the process of sifting through the user's high inventory of photos and videos, digitally accumulated photos on one's mobile phone, selecting uploading and arranging selected photos on a page and into a digital album after the moment or event has happened. Second, including personalized text entries alongside the user's photos and video entries to user's albums by other methods occurred after the event or moment has happened and entered at a later time or day. Sentiment and thoughts can be forgotten or due to time passing, user chooses not to include sentimental text entries. Third, including videos, chronologically alongside your photos and text entries in real-time, as the moment is being capture is not possible in current applications. Currently are over 3.7 trillion photos and videos store on people's mobile phone and it is becoming more and more of a daunting challenge to select, transfer and organize one's most precious memories. Many find the effort of preserving, backing up and organizing such documentation too much of a hassle to bother with the risk losing or finding it extremely hard to find life's most precious memories.

Thus, there is a need for a system, method, and apparatus to compile photos, journal, text entries, and home movies into a single, unified volume as the moment is happening and being captured. The need for a system and method to do so in real-time, as the photos and videos are being captured and text journaling or texting milestones, thoughts and sentiments populate into the user's album alongside the user's photos and videos, chronologically and an organized album.

There is a further need for a system and method to contribute text in real-time, as the photos and home movies are being captured, thoughts, sentiments and milestones are entered alongside your photo and videos creating the most, accurately documented album, that saves directly down to the second created that entry. Each entry included time, date and/or location stamp under each entry in the album.

Finally, there is a need for a system and method that allows a user to easily duplicate and share any digitally created photo albums, journals, and home videos with family, friends, and others in print and/or electronic form in real-time. Multiple users can contribute to the same album at the same time as the moment via video, photos and text entries populate to the same digital and printed album as the moment and event is being captured and documented.

SUMMARY

The present application discloses a method for automatically creating an album by an application to provide users a more convenient method for storing memorable moment.

The method for automatically creating an album by an application comprises selecting the album in the application; entering a camera mode in the application while a text journal bar shown within the camera mode to start a capturing process for at least one media; texting in the text journal bar before captured the at least one media if needed; capturing the at least one media via the application; showing the at least one media with text entries, if any, by the application; and automatically populating the at least one media directly into the album in real time. Wherein the text journal bar will be shown on the screen as long as the application is in the camera mode.

According to an exemplary embodiment of the method, wherein the step of selecting the album in the application comprises creating the album. The step of creating the album comprises selecting an album template and titling the selected album.

According to the other exemplary embodiment, wherein the step of selecting the album in the application comprises selecting an existing album.

In various exemplary embodiments, wherein after the step of selecting the album in the application, the method further comprises ability of inviting one or more contributing member to contribute in real time alongside the creator of the album.

In various exemplary embodiments, wherein after capturing the at least one media via the application, the method further comprises showing the at least one media by the application. In addition, the step of text entry for the at least one media in the journal bar comprises reviewing the at least one media at same time.

In various exemplary embodiments, wherein the step of capturing the at least one media via the application comprises capturing a photo, taking a video or recording via the application.

According to the other exemplary embodiment, wherein the step of automatically populating the at least one media in the album comprises populating the at least one media chronologically. Each Entry will automatically include place, time and date under each entry to ensure the most accurate documentation.

In various exemplary embodiments, wherein after automatically populating the at least one media in the album, the method further comprises storing the album on a storage media. In addition, the step of storing the album on the storage media comprises automatically storing the album on a non-writable storage media, a writable storage media, or a communications media.

In various exemplary embodiments, wherein after the step of automatically populating the at least one media in the album, the method further comprises reminding when the at least one media reaches a minimum amount; ability of selecting at least one or more contributing member; and creating at least one physical copy of the album. Application will automatically include date of first entry and last entry of the selected album on the cover and the spine of the album alongside the title of the album. The step of creating at least one physical copy of the album, videos accompanying the selected album comprises creating DVD or CD to store the Video Contributions to the actual physical Album. Digital version of the album will have all entries within the album, populating chronologically. The step of reminding when the at least one media reaches the minimum amount comprises reminding when the at least one media reaches 90 pages.

In various exemplary embodiments, wherein after the step of automatically populating the at least one media in the album, the method further comprises sending an alert when the album is full.

In various exemplary embodiments, wherein after the step of automatically populating the at least one media in the album, the method further comprises reviewing the album and making simple edits before purchasing.

The present application also discloses a system for automatically populating media chronologically directly into an album in the system, the system is running on a smartphone with a screen, the system comprising:

a processor configured to: selecting the album in the application; entering a camera mode in the application while a text journal bar shown within the camera mode to start a capturing process for at least one media; texting in the text journal bar before captured the at least one media if needed; capturing the at least one media via the application; showing the at least one media with text entries, if any, by the application; and automatically populating the at least one media directly into the album in real time. Wherein the text journal bar will be shown on the screen as long as the application is in the camera mode.

Based on the above, the present application allows users to creating an album without the added step of having to select and upload to fill an album. In addition, the user may also invite other edit member to contribute media for the album at the same time.

In current technology, it is required for the user to leave the capturing function such as camera or recorder to input the words. Other applications do not allow user cannot write down the comments in real time, it is very likely to forget or lost the emotion or thought afterwards. However, in our application the journal bar is shown when reviewing the media after capturing, the user may record the memorable moment by texting words inside the journal bar in real time. The entry automatically popped out journal bar provides the users a more intuitive way to input their comments at the time.

Numerous other advantages and features of the present application will become readily apparent from the following detailed description of disclosed embodiments, from the claims and from the accompanying drawings.

BRIEF DESCRIPTION OF THE DRAWINGS

The objects, features and advantages of the present application will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which.

DETAILED DESCRIPTION OF THE INVENTION

Figure 1A:
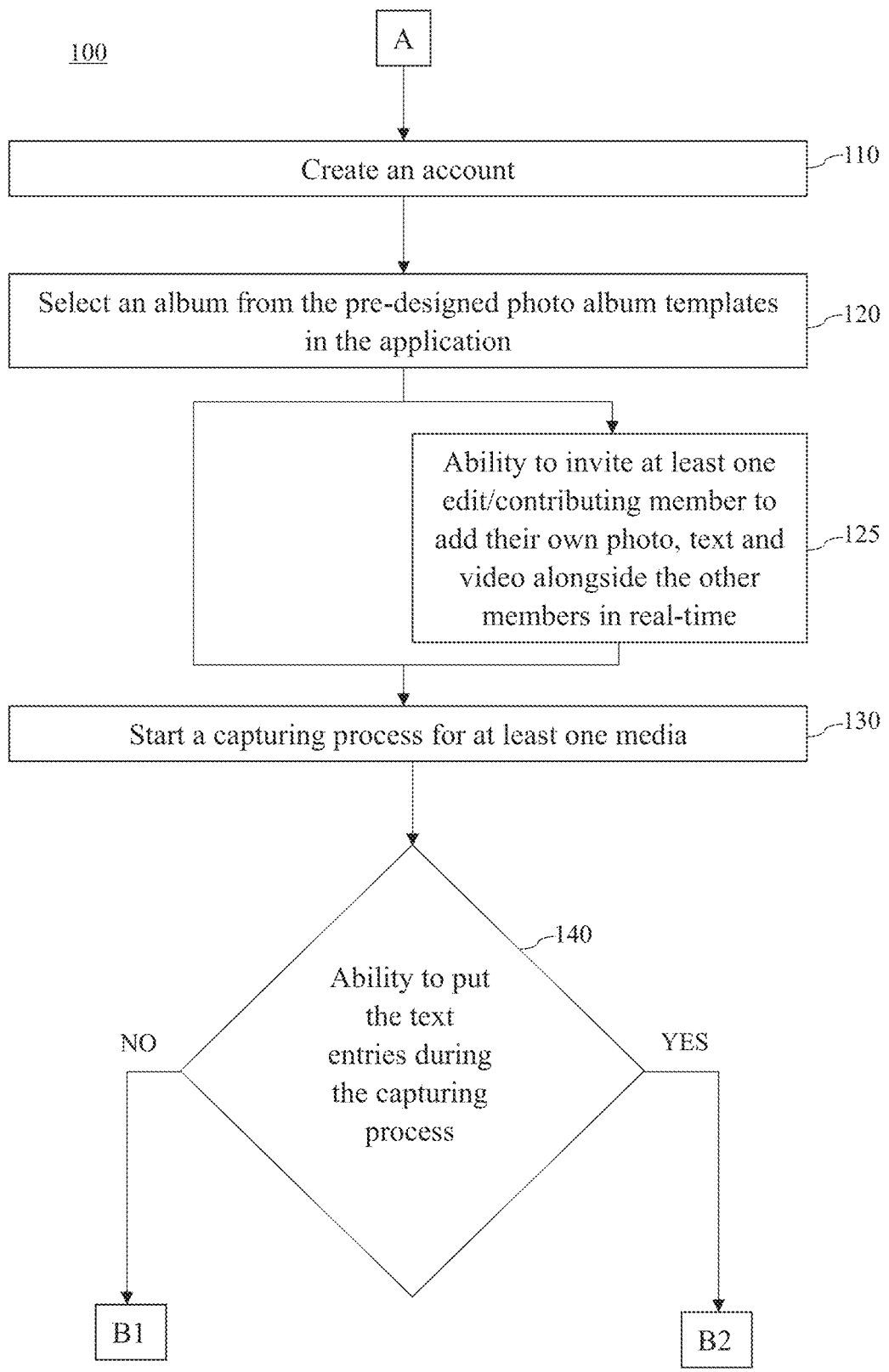
FIGS. 1A and 1B are a flow chart of a method for automatically creating an album by an application.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

"Image" or "photo" refers to a digital or print image. The terms "photo album," "digital album," "photo book," or "scrapbook" means any type of media-based project, in digital or print form. A photo album may be printed on paper and bound together as a book. "Media files" refers to audio files, video files, text files, or image files.

Embodiments of the present application relate to applications, methods, and systems for creating media-based projects, such as a photo album.

The present application is directed to a program or application that is run on a mobile device. The application is concerned with creating a digital volume containing a compilation or album with photos, a journal, and home videos as well as providing the photo album and journal in the form of a bound, physical album with an accompanying digital copy of the home videos and photos contained in the album.

The photos can be taken by one or more users and stored within the memory of each user's electronic device and on the application's server.

The personal text of the journal can be input directly by the user, or meta data may be automatically populated by the use from the photo's meta-data, which includes time, date and location.

The home videos may together comprise a video log, video diary, or other short film or video taken to record and preserve experiences, activities, and special events as it happens and is stored, chronologically, in real-time alongside photo and text entries.

Figure 2:
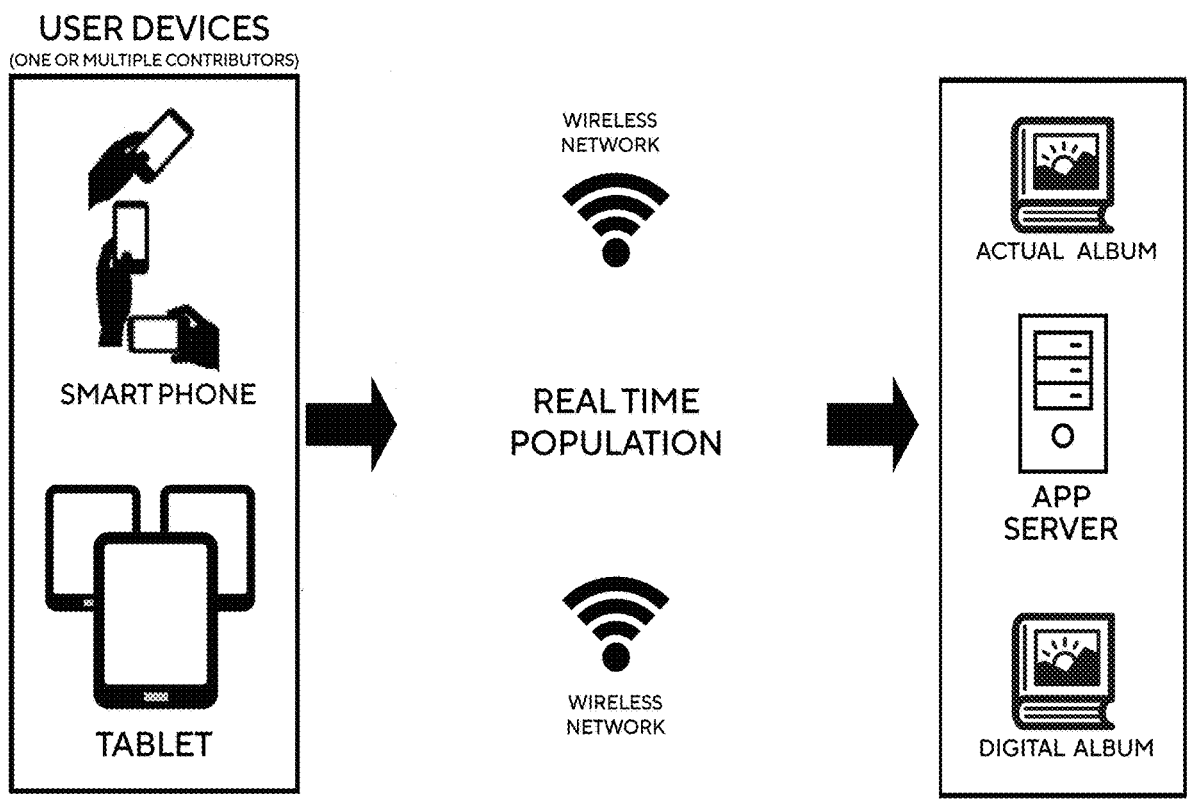
FIG. 2 is a view showing a network configuration diagram in which the present invention may be practiced.
Figure 3:
FIG. 3 is a view showing an interface of creating an account.

The program or application of the present application can be used in connection with an electronic device. The electronic device may be mobile device such as a tablet computer, mobile computer or smartphone but may also be embodied in any one of a wide variety of wired and/or wireless computing devices. For example, FIGS. 2-3 depict the use of the program or application with a smartphone. The electronic device includes a processing device (processor), input/output interfaces, a display, a network interface, a memory, an operating system, and storage. The electronic device may also include a touchscreen interface for ease of use, and a global positioning system (GPS) communicating across a local data bus.

The electronic device incorporates a system containing the program or application for creating ae.

The processing device may include any custom-made or commercially available processor, a central processing unit (CPU), or an auxiliary processor among several processor associated with the electronic device, a semiconductor based microprocessor (in the form of a microchip), a microprocessor, one or more application specific integrated circuits (ASICs), a plurality of suitably configured digital logic gates, and other electrical configurations comprising discrete elements both individually and in various combinations to coordinate the overall operation of the system.

The memory can include any one of a combination of volatile memory elements (e.g., random-access memory (RAM, such as DRAM, and SRAM, etc.)) and nonvolatile memory elements. The memory typically comprises native operating system, one or more native applications, emulation systems, or emulated applications for any of a variety of operating systems and/or emulated hardware platforms, emulated operating systems, etc.

The present application may include application specific software, which may comprise some or all the components of the electronic device. In accordance with such embodiments, the components are stored in memory and executed by the processing device. The system and method for digital scrapbooking may be resident in the memory of the electronic device.

In one aspect of the present application, the touchscreen interface is configured to detect contact within the display area of the display, and provides such functionality as on-screen buttons, menus, keyboards, etc. that allows a user to navigate user interfaces by touch. More particularly, user interfaces navigable by touch may be configured to allow users to access digital photo albums.

In another aspect of the present application, the electronic device has a Global Positioning System (GPS) or other means to determine the geographical location of the electronic device. This may allow the user or the application to efficiently determine the time and location that particular events were captured. This information may be automatically incorporated into the visible body of the scrapbook page.

One of ordinary skill in the art will appreciate that the memory can, and typically will, comprise other components that have been omitted for purposes of brevity. In the context of this disclosure, a non-transitory computer-readable medium stores one or more programs for use by or in connection with an instruction execution system, apparatus, or device.

An electronic device network interface may comprise various components used to transmit and/or receive data over a networked environment. When such components are embodied as an application, the one or more components may be stored on a non-transitory computer-readable medium and executed by the processing device.

In one aspect, the present application comprises the networked environment of the system and method for digital scrapbooking. For example, multiple electronic devices may be communicatively coupled via a communication network, as shown in FIG. 2. By way of example and not limitation, each of the electronic devices may be embodied as a mobile computing device such as, for example and without limitation, a smartphone, as illustrated in FIGS. 3-16, or a tablet computer that incorporates cellular telephone functionality. The communications network can use one or more of various communications types such as, for example and without limitation, cellular and Wi-Fi communications.

Figure 4:
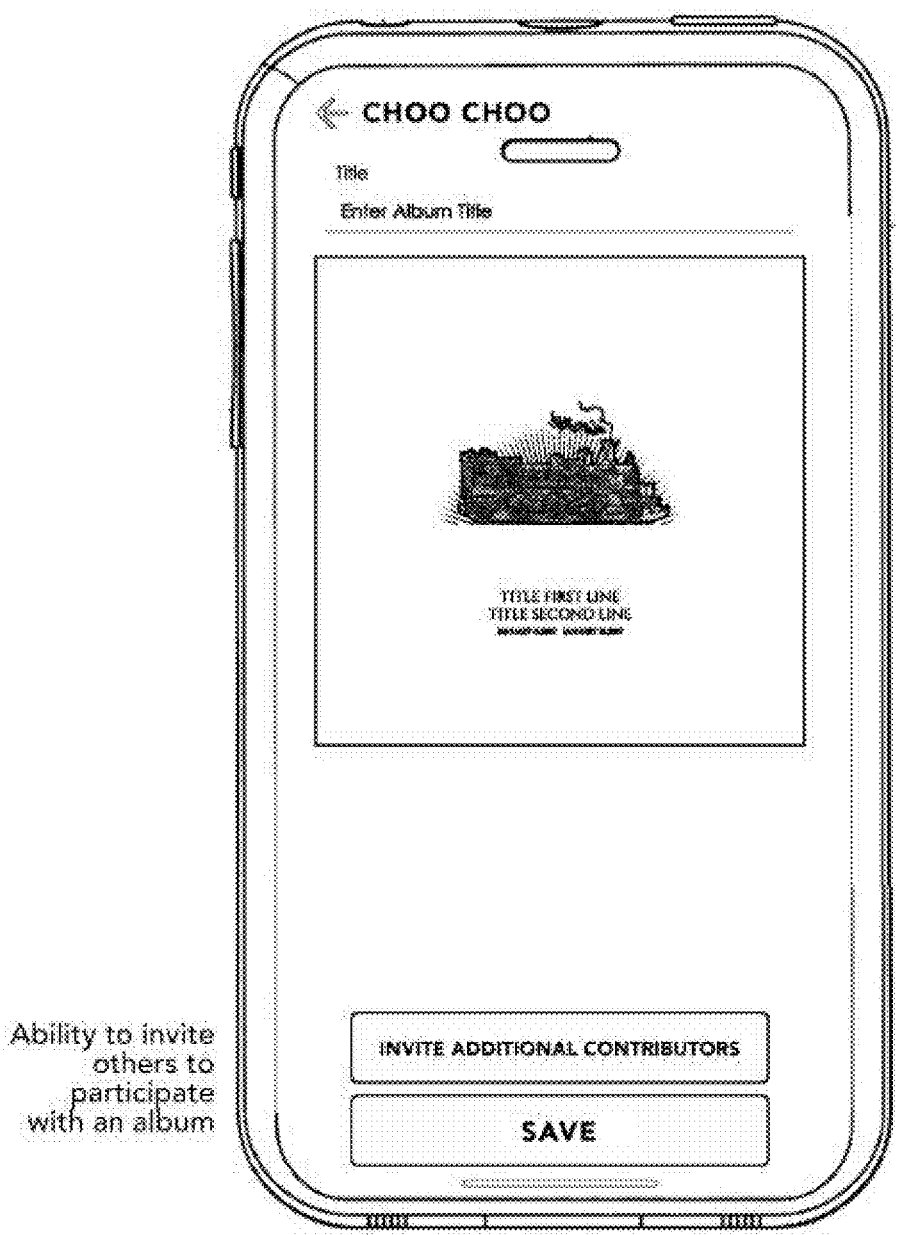
FIGS. 4 and 5 are showing the steps of creating an album is being performed and selecting contact for the ability to share and or invite additional contributors to populate to the same album at the same time is being performed.
Figure 5:
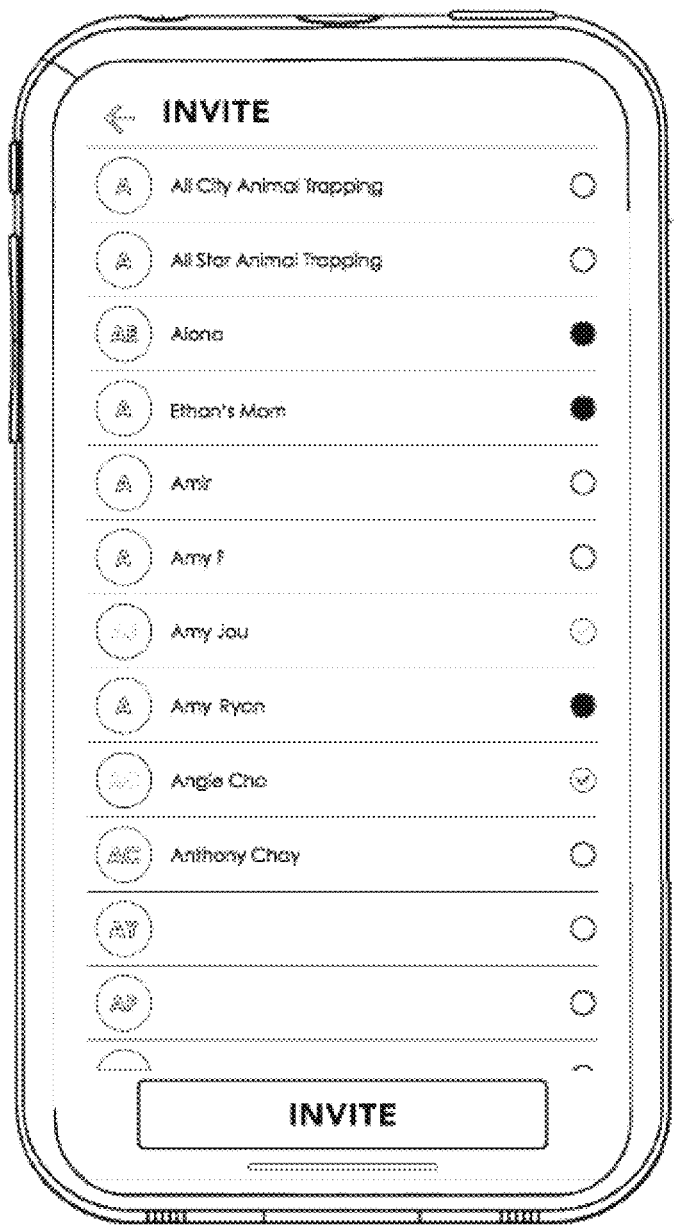
Figure 6:
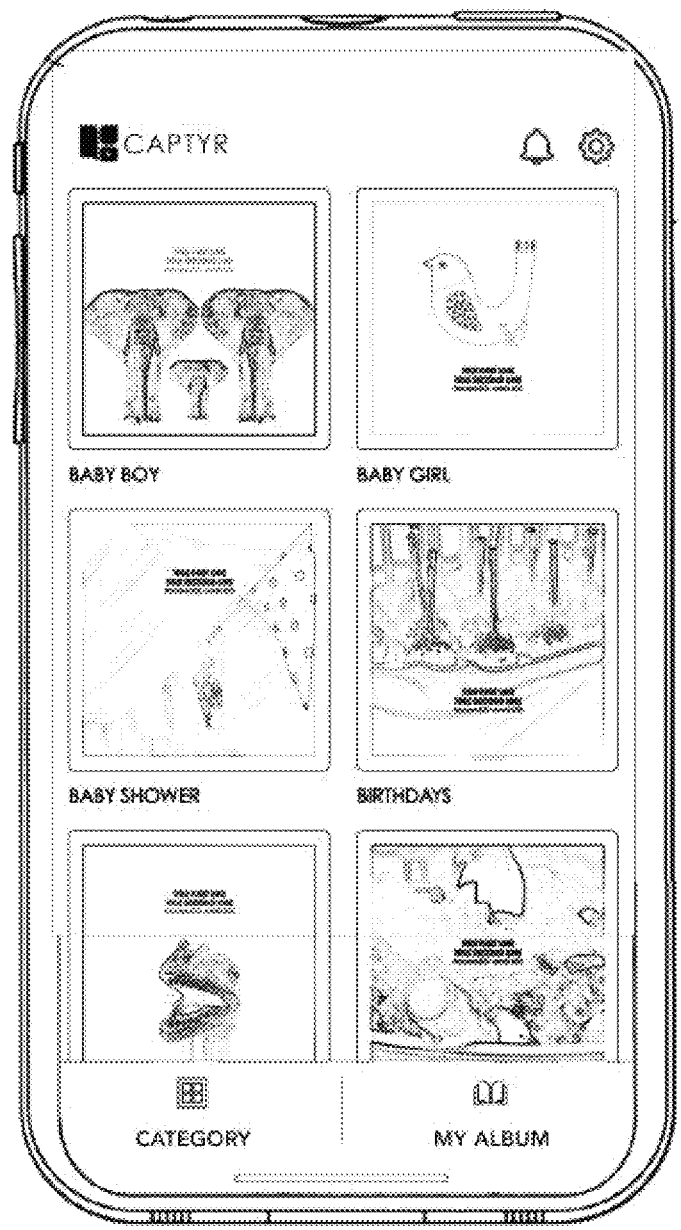
FIG. 6 is a view showing the step of selecting an album style is being performed.

The first step a user will engage in is creating an account, as shown in FIG. 3. Next, the user will create a photo album as shown in FIG. 6 or select from existing albums. The user will also have the ability to invite other users to access the photo album, as shown in FIGS. 4-5.

It is contemplated that the application of the present application may instruct the electronic device to access a digital photo album. The digital photo album may be stored on the electronic device such as in an image galley or library typically stored in a memory portion of exemplary electronic devices.

In one aspect of the present application, the time, date and location information related to a particular photo, video or text entry, may be stored in any digital metadata associated with the photo, and the device automatically incorporate this information into the journal entry relating to the photo. In other words, the system may be configured to automatically include text that indicates where and when a photo, video, and/or journal entry was made on each digital photo album page.

In another embodiment, the user may be prompted to manually type or otherwise indicate the particular context of each selected photo, for example, whether the photo relates to a milestone or accomplishment, a humorous happenstance, or any other description a user deems appropriate.

One aspect of the present application is implemented as a program, application, or product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present application, are embodiments of the present application. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present application, are embodiments of the present application. Broadly, computer-readable storage media and communications media may be referred to herein as computer-readable media.

If embodied in software, each step in the method of making a digital scrapbook or album may comprise program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as any of the aforementioned electronic devices. The machine code may be converted from the source code, etc. If embodied in hardware, each step of the exemplary methods may represent a circuit or a number of interconnected circuits to implement the specified logical function(s). Additionally, although the steps of the exemplary methods are discussed in specific orders of execution, it is to be understood that the orders of execution may differ.

The application of the present application may instruct the electronic device to access a digital video library comprising one or more home videos, video diaries, or other videos that may be stored in a memory portion of the electronic device. Any videos chosen from such a video library may be related in time, subject, location, or context to the aforementioned photos and journal entries and may also be accompanied by journal entries as described above.

In general, the routines executed to implement the embodiments of the present application may be part of an operating system or a specific application, component, program, module, object, or sequence of instructions. The computer program of the present application typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the present application. However, it should be appreciated that any particular program nomenclature that follows is used merely for convenience, and thus the present application should not be limited to use solely in any specific application identified and/or implied by such nomenclature.

The contemplated that digital album of the present application combines aspects of a photo album, journal, and various home videos may be created chronologically so that all, or a variety of user can contribute, photos and videos and text entries to go directly into the album. As shown in FIG.

Figure 10:
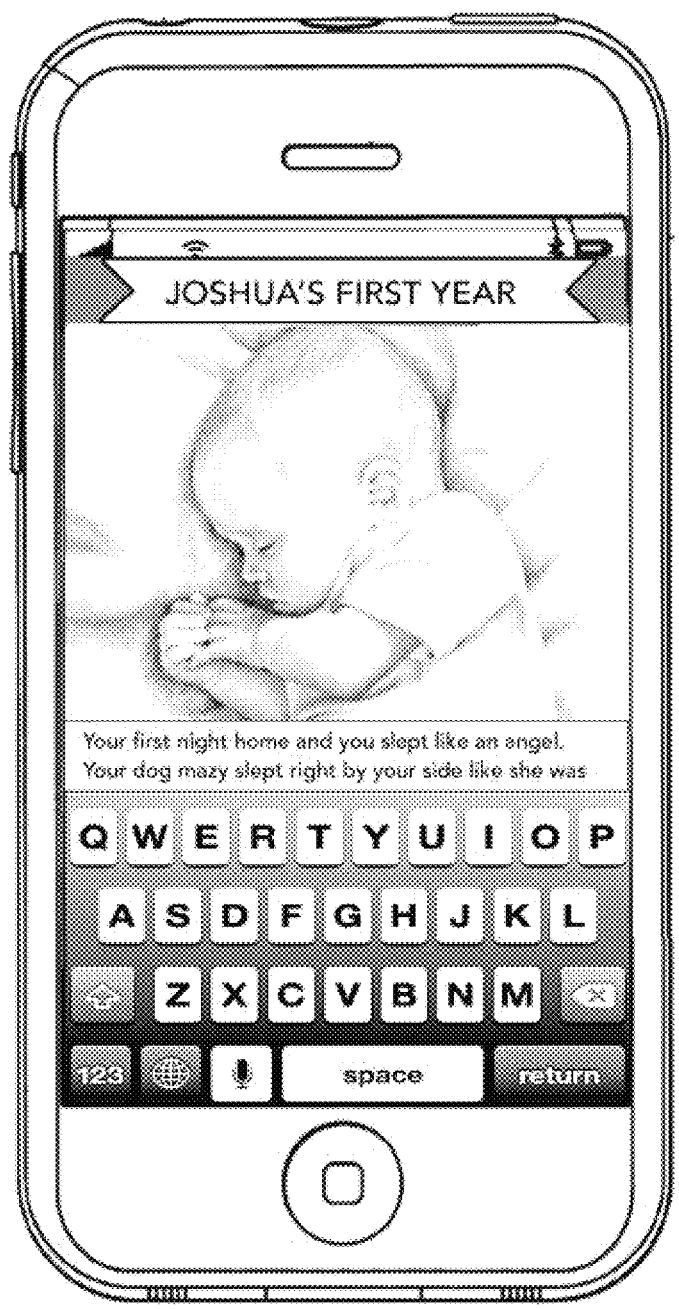
FIG. 10 is a view showing an interface of texting for the at least one media in a journal bar with the keyboard appearing and text entry occurs in camera as a function.

7, the album will contain every photo, video and personalized text entry captured from the user's phone camera and directly enter into the album chronologically with date and time stamp alongside each entry. The electronic device may also receive instructions to configure the one or more photos accompanied by corresponding journal entries on one or more album pages. In one embodiment, a template optionally containing a theme may be provided to accommodate a preset number of photos and/or a preset number of album pages and journal entries, as shown in FIG. 10. In another embodiment, the template may place the photos in a predetermined configuration on each of the album pages. In yet another embodiment, a template may be provided to accommodate journal entries. It is also contemplated that the electronic device automatically populates album page templates with photos and journal entries including information from the metadata of each photo. Use of the metadata of the photo is advantageous because the user may not remember where or when the photo was taken.

It is further contemplated that the number of scrapbook pages, and length of any detailed descriptions may be uniquely specified by the user.

The application of the present application allows the user to efficiently preserve the user's personal or family history as events occur in a digitally created scrapbook. This digitally created scrapbook provides viewers a more accurate sense of the history surrounding the subjects of the combined photos, journals, and home videos. Moreover, it may relieve the user of the difficulty associated with compiling photos and videos, as well as drafting captions to describe the photos and videos.

It is also contemplated that the application may receive instructions to create multiple photo albums simultaneously. For example, if a parent would like to create a photo album for each of his or her two or more children, he or she may create a separate album, designated by a title of his or her choosing, for each child. Then, the user may direct photos, videos, and journal entries relating to each child to the child's respective album simultaneously as the user captures moments that he or she would like to preserve in the child's respective album. In addition to sorting by a person, it is contemplated that the application may be instructed to store and contribute to multiple scrapbooks so that a user may create scrapbooks featuring certain events, people, stories, themes or any other reason they may wish to separate their photos, videos, and journal entries.

In one aspect of the present application, the application may store each photo album for a user to return to or complete at a later date. This may allow a user to include events in a scrapbook as they occur without any fear that prior pages or memories will be lost or otherwise inaccessible.

The aforementioned steps may be repeated until various photos, journal entries, application does not provide embellishments surrounding the photos and journal entries are presented in a series of digital pages. Such pages may also be accompanied by digitally captured home videos so that the user may be provided with a unified digital copy of related photos, journal entries, and videos.

It is an additional object of the present application to include journal entries included in the digitally created scrapbook. It is still another object of the present application to provide printed copies of any digitally created scrapbooks to one or more third parties specified or selected by a user.

Also presented is a system comprising the application of the present application, an electronic device, a network, one or more servers, and a service provider. The service provider can be, for example, a commercial company that is in the business of printing books. The service provider may be instructed to provide a physical copy of the digital photo album with journal entries once a predetermined number of digital pages have been designed. For example, the system may be instructed to print a fifteen-page album. Thus, when photos, journal entries, and video encompass fifteen printed pages, the system is instructed to print the digitally rendered pages and deliver them in the form of a bound, printed volume to the creator of the book. One skilled in the art will recognize that videos are not generally printed in still, frame-by-frame form as photos are. It is contemplated that any home videos accompanying the photos and journal entries in the album may be included with the printed volume in digital form. In this digital album form, to be shared via the internet, videos will appear chronologically, alongside photo and text entries. For example, a CD ROM, DVD, or thumb drive may be appended to the volume containing such home videos. In one embodiment, a digital copy, such as stored on a DVD, secure digital (SD) card, or thumb drive, of the digital photo album pages and journal entries may also be appended to the printed volume. It is also contemplated that, individual photos included in the printed volume may be included in digital form.

It is also contemplated that the system may be instructed to print and send a physical and digital copy of the combined photo album, journal and home videos after a specified amount of time has passed. For example, the system may be instructed to compile and send album pages and home videos at the end of a single month, every three months, or even every year. Of course, such prescribed time periods are offered only by way of example and not of limitation.

The system may also allow the user to share the combination photo album, journal, and home videos with friends, family members, and others. For example, the system may be instructed to send a printed volume, along with a digital copy of any home videos and copy of the album, of the digitally created album to any address associated with the friends, family, or others.

It is contemplated that the system may communicatively link the user with family, friends, and others in a social network embodied by the system and method for digital scrapbooking. Optionally, the digitally created photo album, journal, and compiled home videos may be shared on existing social networking websites such as Facebook® and Twitter®.

The server is made up of hardware and software to implement the instructions of the application as directed by a client. The client can on a mobile device or tablet. In the present application, a server implements the system and method for digital scrapbooking and facilitates sending digital and physical copies of any completed albums to the user and any members of the network associated with the completed scrapbooks. In order to facilitate the aforementioned functionality, various aspects may be performed by one or more of the aforementioned electronic devices. In one aspect, the electronic device is operative to perform, at least in part, an embodiment of the method for digital scrapbooking. This method may include, for example: accessing a digital photo album; selecting one or more photos from the photo album; receiving detailed descriptions comprising journal entries associated with each of the one or more selected photos; applying the one or more selected photos with their corresponding journal entries in a chosen configuration on a digital page; applying one or more design specifications as embellishments on the digital page; selecting home videos to include; repeating the prior steps until a variety of embellished photos and journal entries as well as home videos are presented on a predetermined number of digital pages; and delivering a printed volume including the photos and journal entries to one or more specified recipients with a digital copy, such as on a CD ROM, of the compiled home videos, digital album pages and/or individual photos included in the printed volume.

The present application also contemplates operation of a system that is operative to perform for a method of performing digital scrapbooking. This method automatically populates your photos, videos and text entries. Printing the digital pages; and delivering a printed volume including the photos and journal entries to one or more specified recipients with a digital copy, such as on a CD ROM containing the home videos, digital album pages and/or individual photos included in the printed volume. And a Digital Album that can be purchased and shared on the internet with Videos included within the digital album.

It is also contemplated that users of the application of the present application may create their own private social network centered on a particular combination of photos, journal entries and home videos. For example, in one aspect of the present application, an album that memorializes a celebratory gathering, such as a wedding, baby showers, anniversaries and themed parties, might include each of the guests of the wedding as part of the social network to contribute to selected albumin real-time. As another example, the album may depict images and events associated with a newborn's first months, and the social network may comprise the newborn's close relatives and friends of the newborn's parents. Indeed, the social network may comprise any such family members, friends, or others who may be particularly concerned with preserving memories reflected in a scrapbook.

Once an album is completed, the user who created it may instruct the system to send a digital or print copy of the album of photos, videos and journal entries to anyone in your social network.

In another aspect of the present application, the digital or print copies of a completed scrapbook may be sent to a family member, friend, or others independent of his or her membership in the social network. For example, a user may instruct the system to send digital or print copies of the album to one or more family members, friends, or other associates by uploading an address to the system.

Figure 1B:
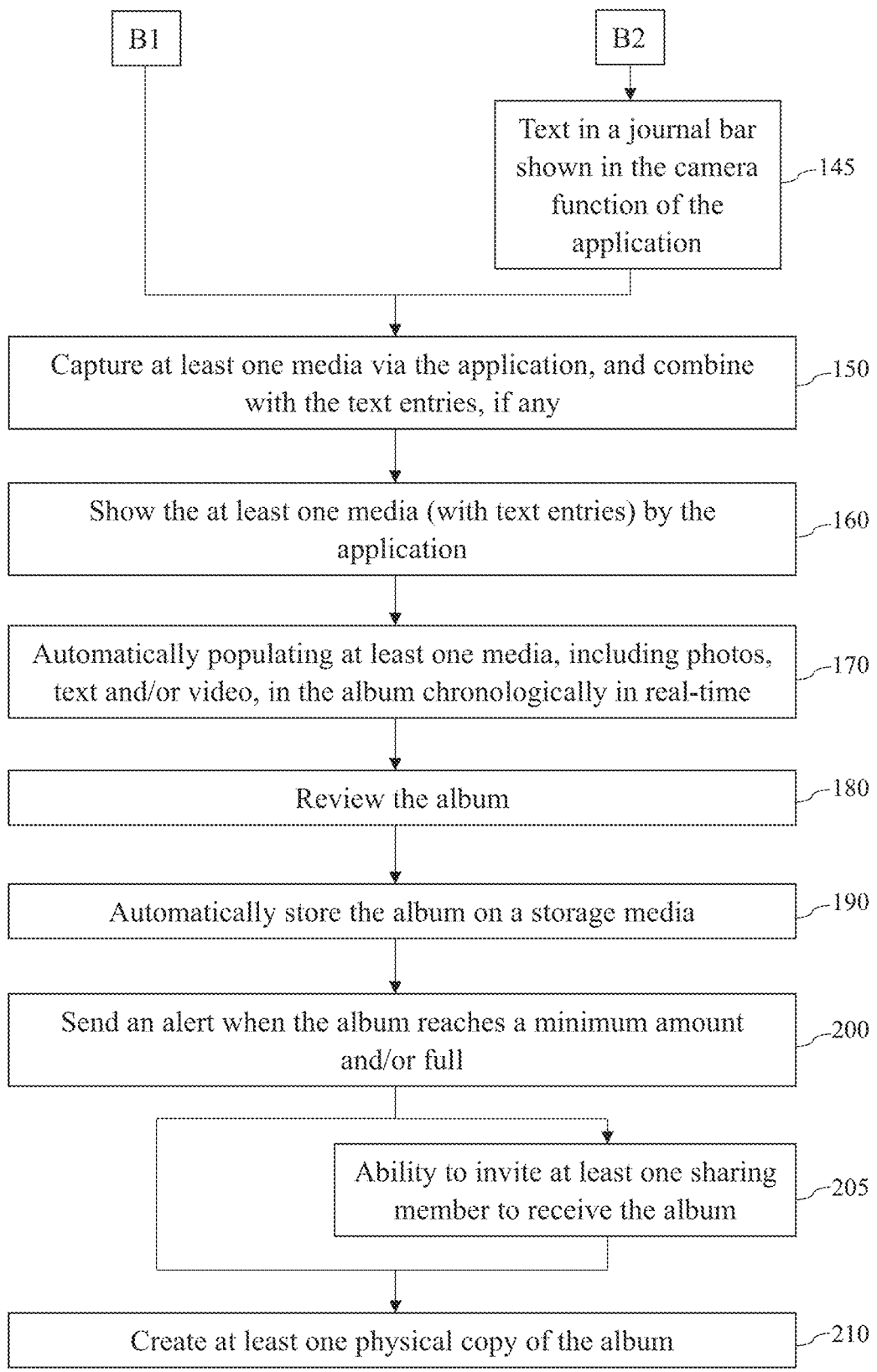

Referring to FIGS. 1A-1B with reference of FIGS. 2-20 to further describe an example of the method 100 for automatically creating an album by an application of the present application and the system using this method.

Figure 8:
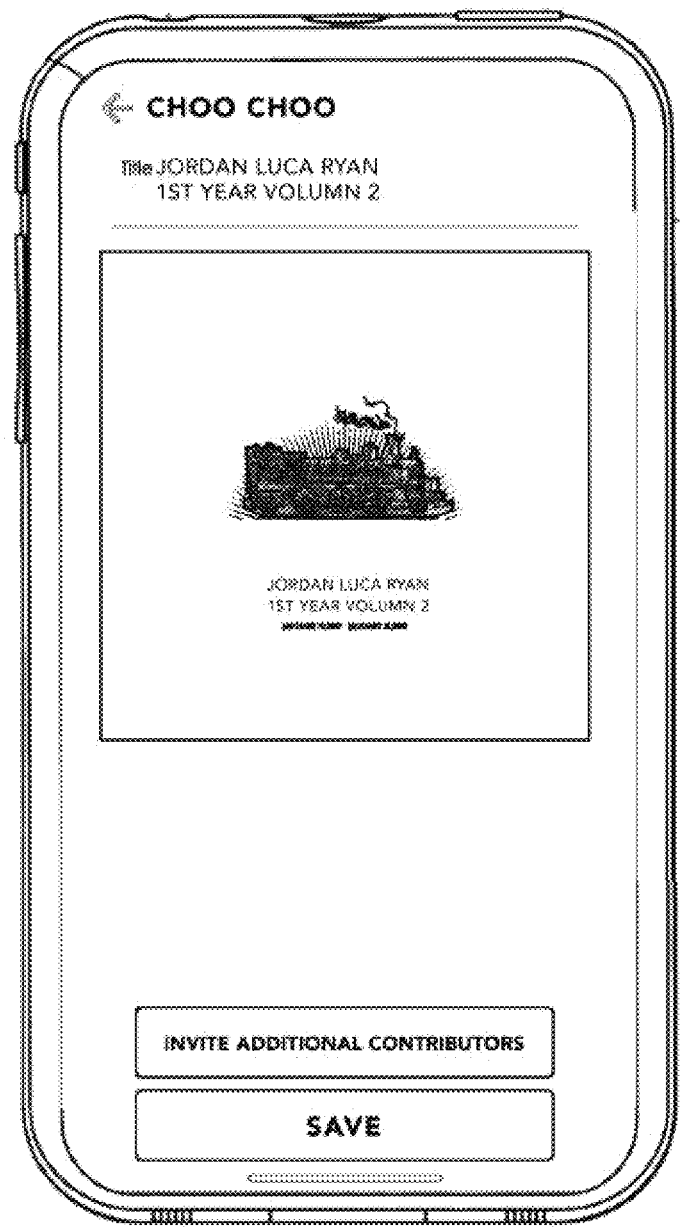
FIG. 8 is a view showing the album is created and the title is established an interface of capturing at least one media entry via the application.

First, selecting the application and creating an account as shown in step 110 and FIG. 3. Next, creating an album from the pre-designed photo album templates in the application as shown in step 120. Specifically, the user may select an existing album created which already created and stored in album library. Or, the user may create a new album by selecting from the pre-designed photo album templates in the application as shown in FIG. 6. Specifically, when selecting from the pre-designed photo album templates, the user may select an album template as shown in FIG. 6 and title the album as shown in FIG. 8.

After selecting the album in the application as step 120, the user may start to capture the media as shown in step 130 or invite at least one edit member to contribute media for the album together as shown in step 125 and FIGS. 4-5. Specifically, the present application allows the user to select edit members from contact list. As such, the edit members may contribute alongside while the user updating the album.

Figure 9:
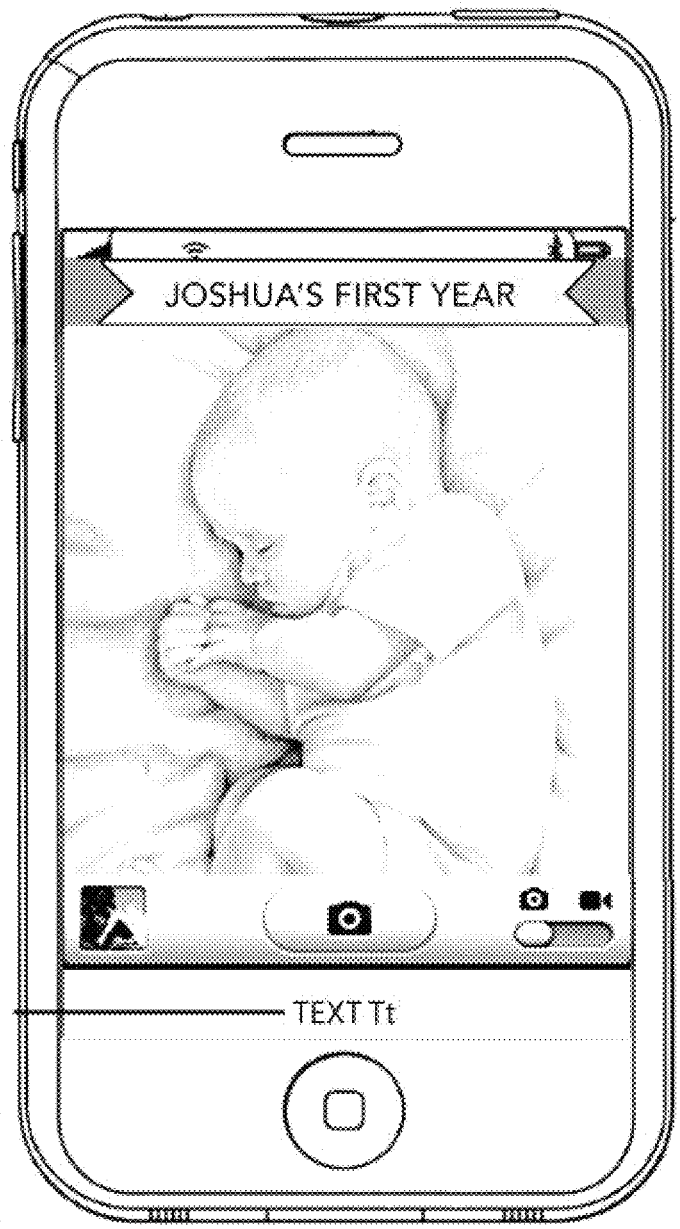
FIG. 9 is a view showing an interface of capturing at least one media entry via the application with the text journal bar is showing on the screen while the application is at camera mode.

As shown in step 140, before capturing the at least one media via the application, a journal bar will show immediately when the application is in the camera mode as shown in FIG. 9, and the user has the ability to decide whether to put the text entries during the capturing process. If the user decides to put texts in this media, he or she can click the journal bar and start to type in the journal bar as shown in step 145 and FIG. 10. After that, the user can then capture the at least one media as shown in step 150. If the user decides not to put texts in this media, he or she can directly perform step 150. Please note that there is no pop-up notice or message in the application showing that the user should decide whether to text, and this will make the usage more concise and intuitive. In other words, in steps 140 and 145, the user does not need to leave the camera mode to type the comments. Therefore, the current feeling can be recorded immediately, and will not be forgotten due to record lately.

In step 150, the at least one media is captured by the user, and the texts typed in step 145 (if any) will be combined with by the application. Furthermore, if the user invites other edit member in step 125, a plurality of sub-albums is created according to a location of other edit member as shown in step 125. As such, multiple contributors can contribute the media into the album and share it afterwards. In step 150, the user can select taking video function or picturing function by changing the switch shown in bottom right of FIG. 9.

After capturing, the application may show the captured media as shown in step 160. In addition to the media previewed in the app, if the user has previously entered a comment, it will also be displayed in this step.

Figure 7:
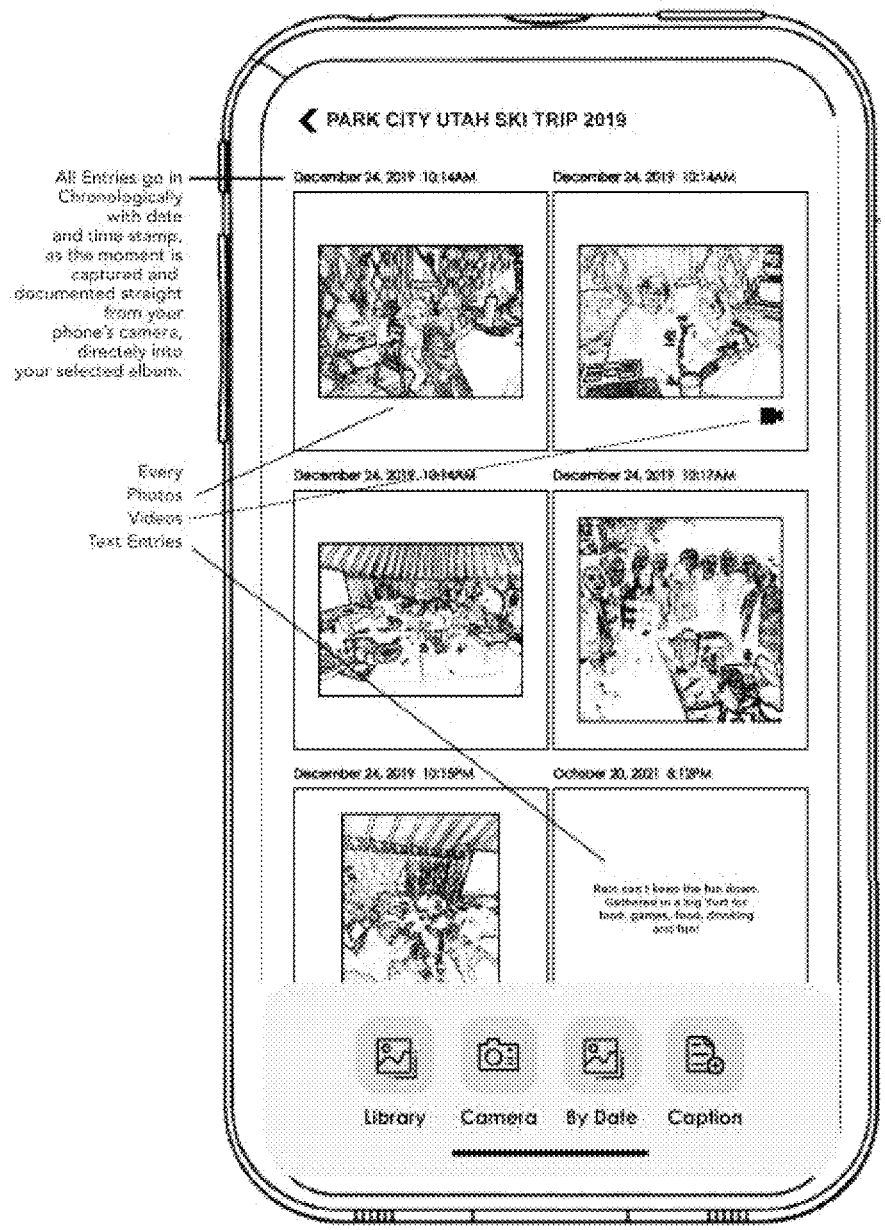
FIG. 7 is a view showing how the photos, videos and text entries populate in real-time alongside each other. Every entry populates chronologically with date and time stamp alongside each entry.

After showing the captured media, the application may automatically populate the captured media in the album chronologically and in real time as shown in step 170 and FIG. 7. The user may select the arrangement method; the present application is not limited thereto. In detail, the captured media with the text/journal entry will be saved into selected album alongside together with time, date and location stamp under each entry.

Next, as shown in step 180, the user can review the album. After confirmation of the user, the album will be stored on a storage media as shown in step 190.

Figure 11:
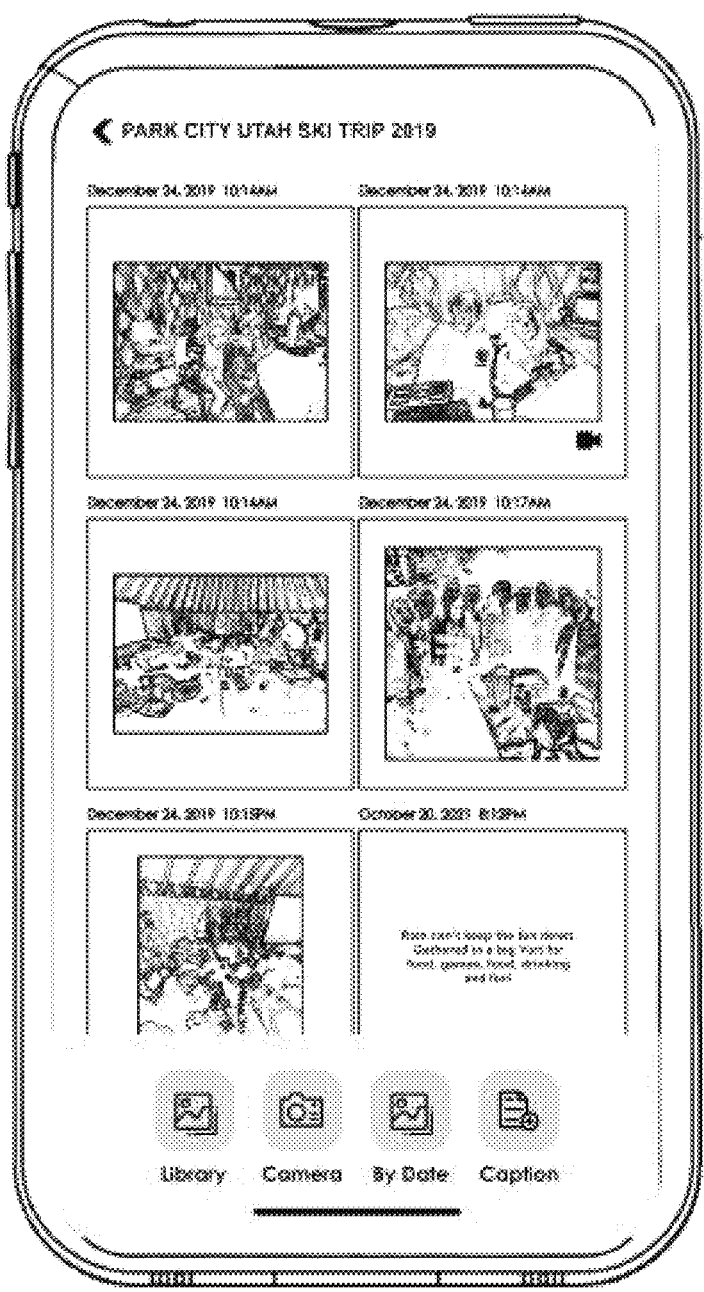
FIG. 11 is a view showing the album is full of media, and user can have the ability to edit or delete the photos, texts, and/or videos.
Figure 14:
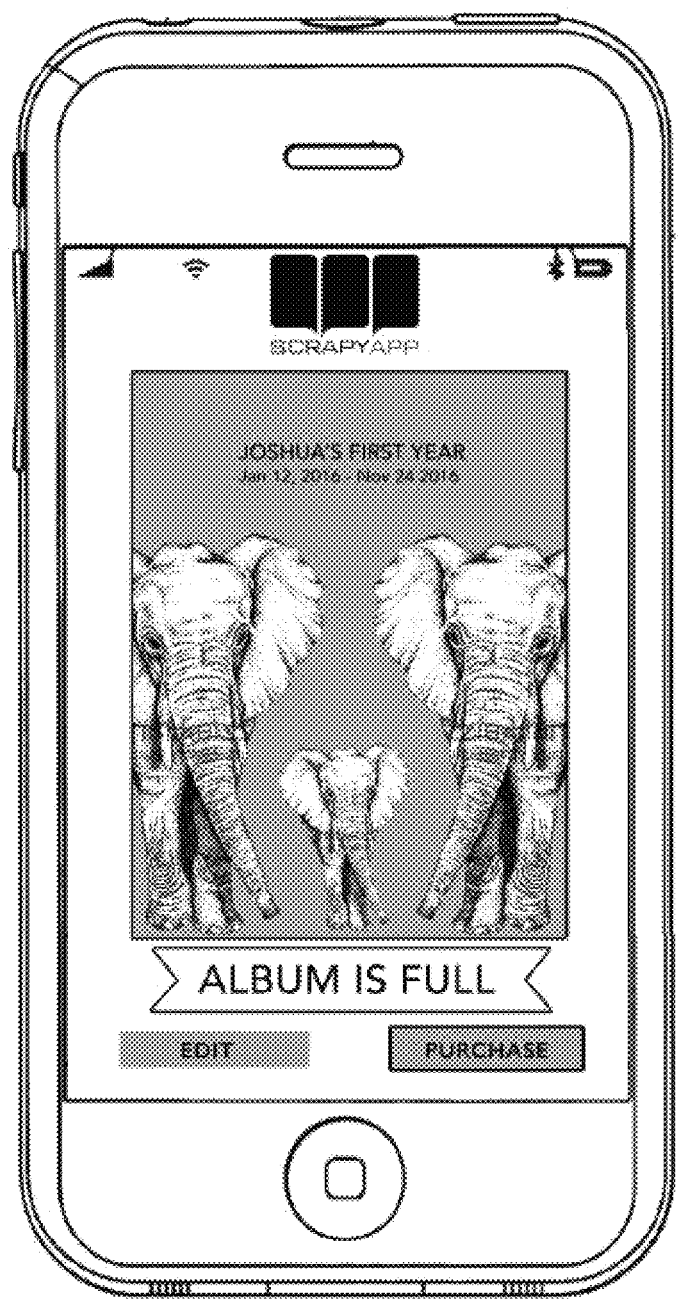
FIG. 14 is a view showing an interface when the album is full, and user can select the ability to edit the photos or order and purchase album.
Figure 15:
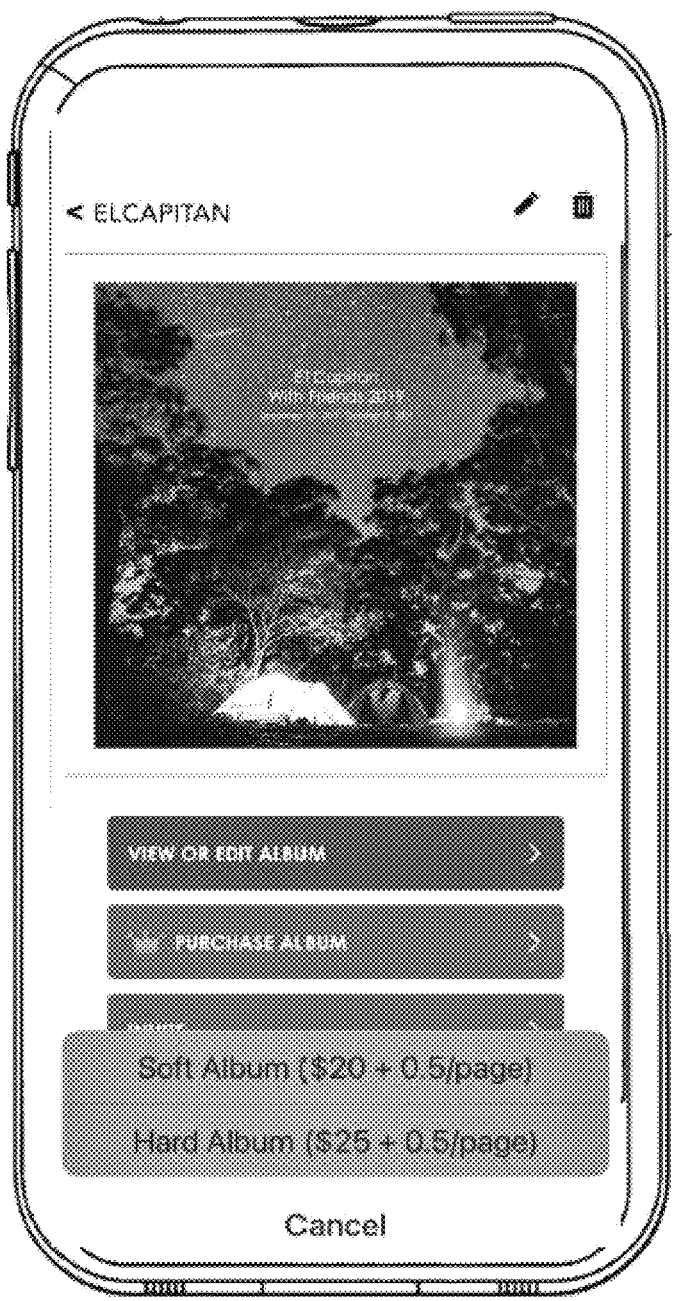
FIG. 15 is a view showing an interface of selecting the soft and/or hard cover of the album.

Referring to FIGS. 11 and 14 and step 200, the system may send an alert the user when the media reaches a minimum amount or full. Specifically, the minimum amount of the present application is 90 pages. Each page may comprise different amount of media, depending on user setting.

Figure 12A:
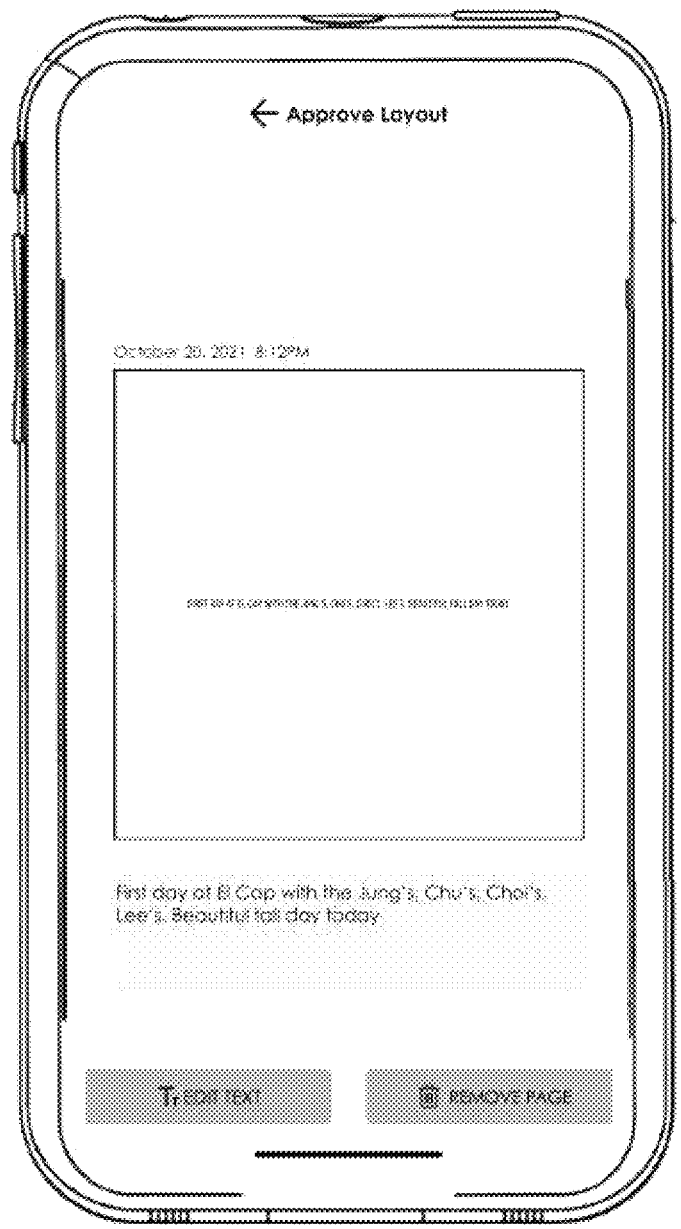
FIGS. 12A-12D are views showing the interface of editing or deleting photo, text, and/or video.
Figure 12B:
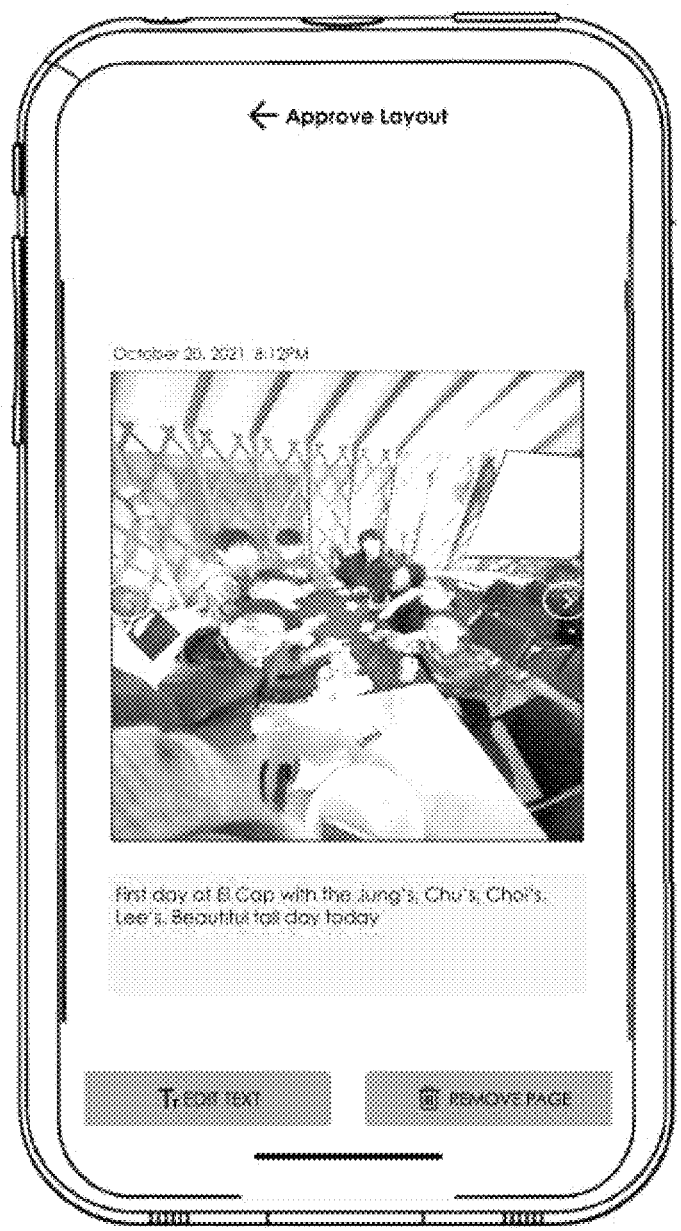
Figure 12C:
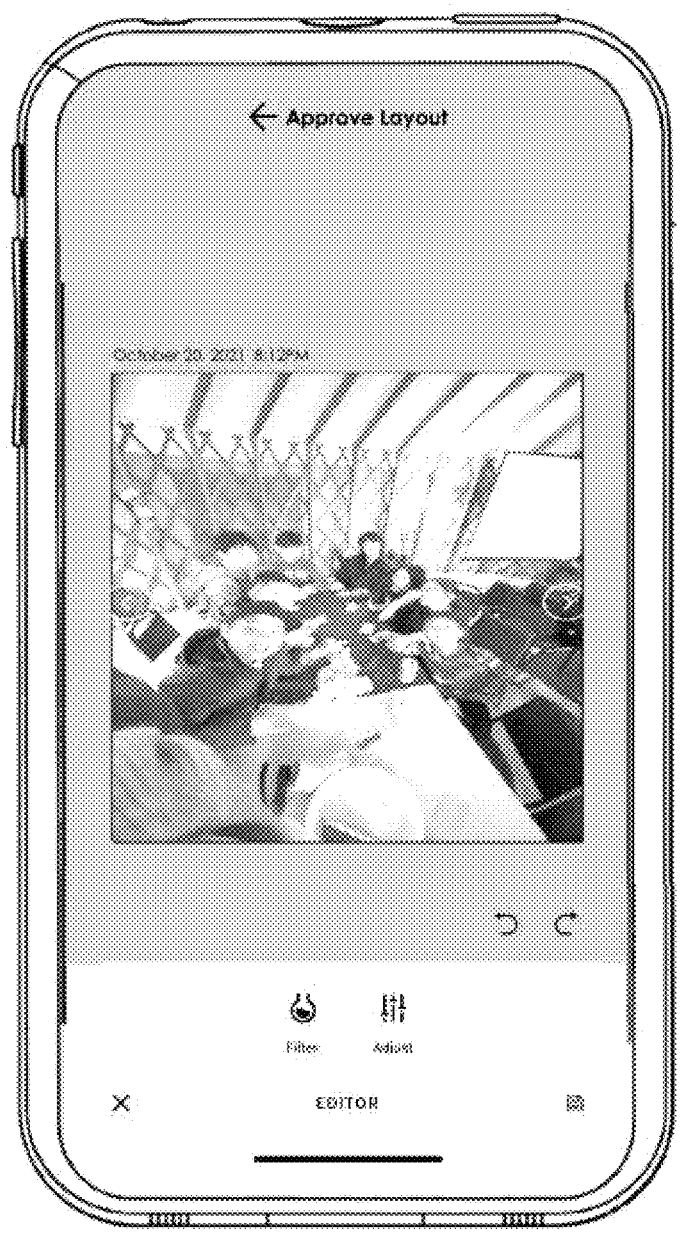
Figure 12D:
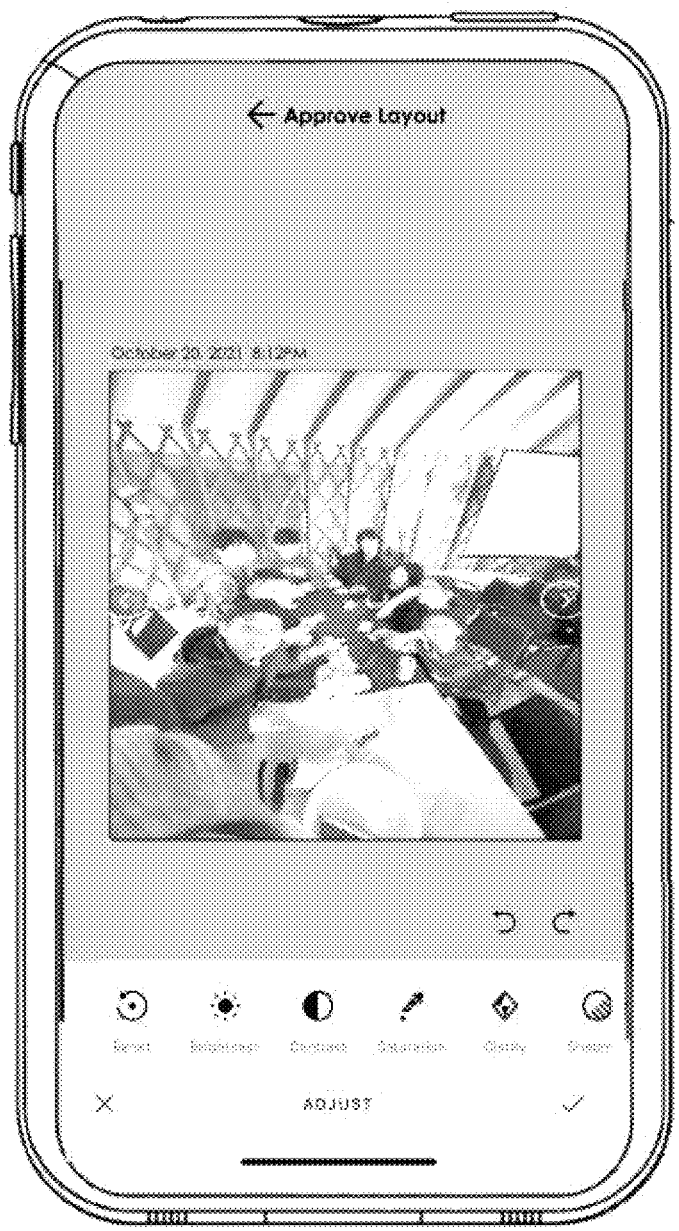

When reaches the minimum amount, the user may keep input the media, review pages, edit or create a physical copy. Specifically, as shown in FIG. 11, if the user would like to edit or delete the media after reviewing, he or she can click on the photo, text, or video. After clicking the photo, text, or video, the application will go into an edit mode, and the "T" at the bottom left means edit text entry as shown in FIG. 12A, the "recycle bin" button at the bottom right means remove the media or the text entry. If the user clicks the photo or video again in the edit mode, the user can edit the photo or video by applying a preprogramed filter or select adjustments, such as brightness, contrast, clarity, shadows, etc., as shown in FIGS. 12B-12D. The user can also delete the photo, or video in the edit mode, which is the same "recycle bin" button located on bottom right. When the user finished the editing, he or she only needs to hit check and the new image will populate back into your album.

For example, if the user clicks the "T" button, the journal bar will be appeared again for editing as shown in FIG. 10. After finishing editing, the interface will jump back to the page as shown in FIG. 11.

Figure 13:
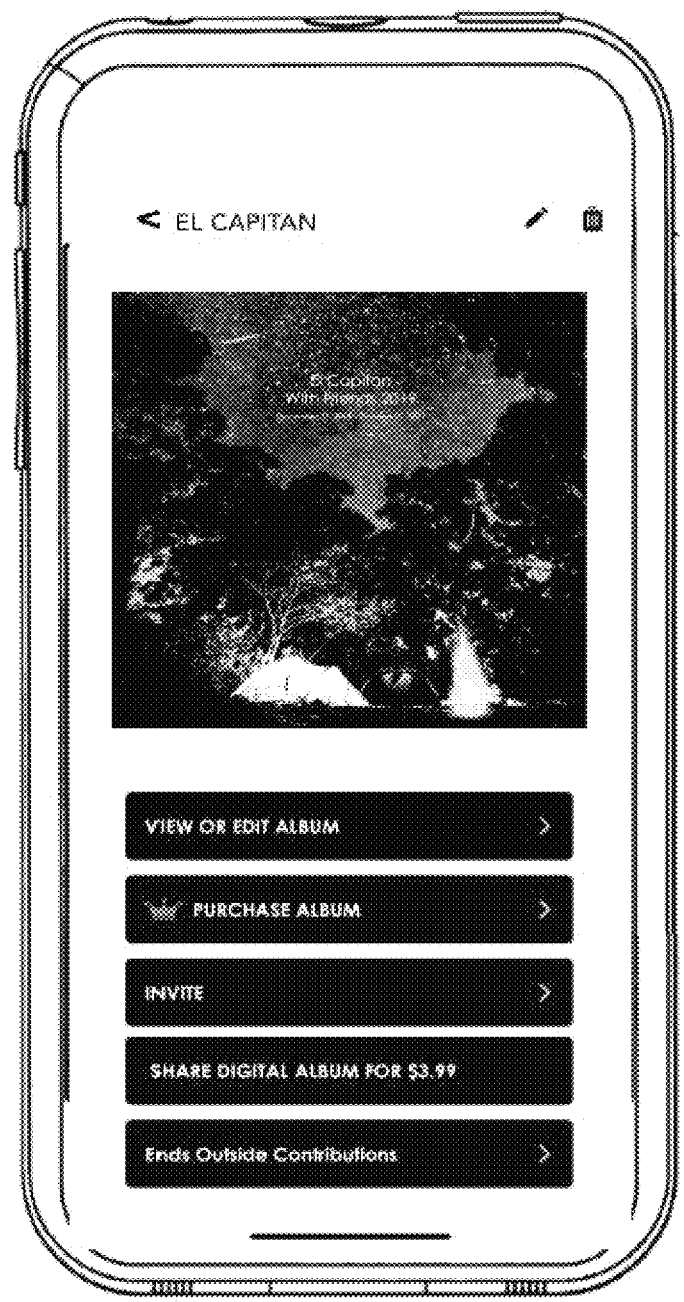
FIG. 13 is a view showing ability to invite additional contributors to join in populating the selected album with new photos, videos and text entries directly into the selected album as the photo, video or text entry is being captured. Also show the ability to take over the album and ends outside contributions. And user can select the ability to edit the album.

If the user would like to create a physical copy, the user may click the purchase button as shown in FIGS. 13-14. For FIG. 13, the user can call up any album and edit contents. The "VIEW OR EDIT ALBUM" bottom will open up the album page to let the user to select albums. In addition, the user may select sharing member(s) to share as shown in step 205 and the bottoms "INVITE" or "SHARE DIGITAL ALBUM FOR $3.99" shown in FIG. 13.

Figure 16:
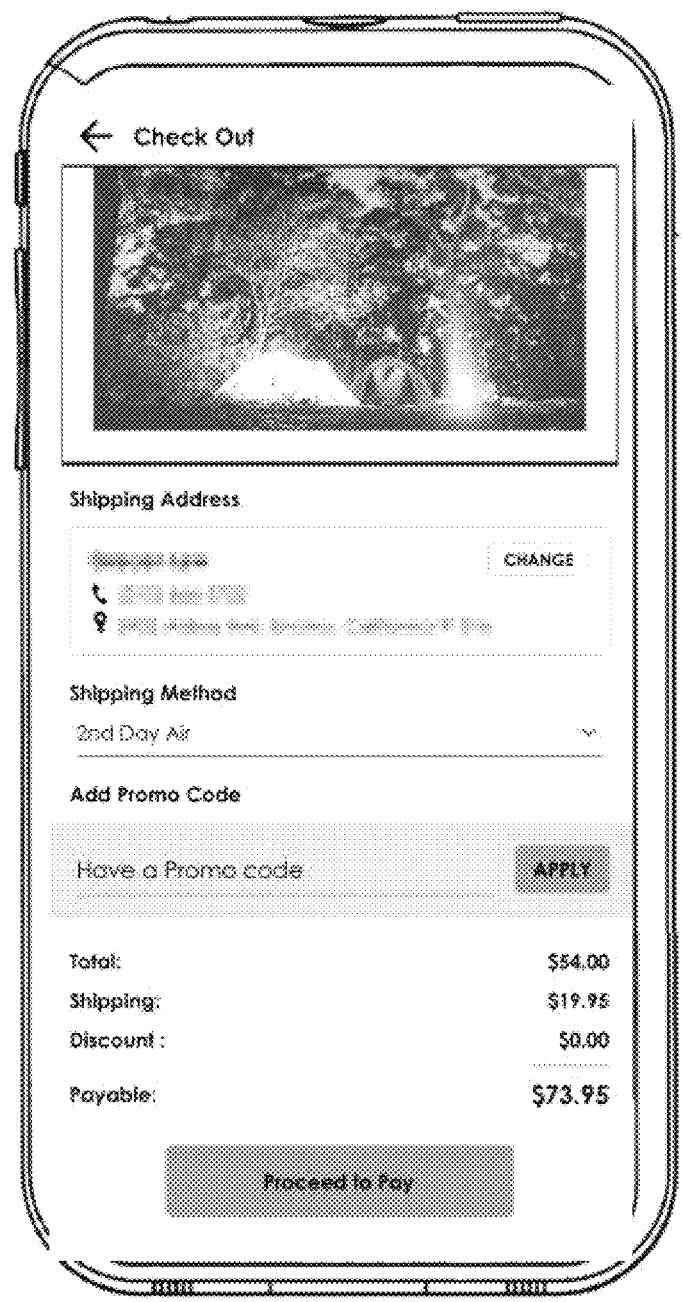
FIG. 16 is a view showing an interface of the payment process in ordering the photo album.

Lastly, as shown in step 210, at least one physical copy of the album is created after the user proceed with the payment process in ordering the photo album as shown in FIG. 16. The application will automatically add date of the first entry to the last entry to the cover and the spine of the album alongside the title of album Digital archived copy of the album will include Photos, Videos and Text entries.

Based on the above, the present application allows users to creating an album without manually uploading every figures. In addition, the user may also invite other edit member to contribute media for the album, or contributing and creating multiple sub-albums at the same time.

In current technology, it is required for the user to leave the capturing function such as camera or recorder to input the words. Other applications do not allow user to write down the comments in real time, it is very likely to forget or lost the emotion or thought afterwards. However, the journal bar of the present application is shown when reviewing the media after capturing, the user may record the memorable moment by texting words inside the journal bar in real time. The entry automatically popped out journal bar provides the users a more intuitive way to input their comments at the time. In conclusion, the present application provides a method for creating an album in real time that automatically self-populates photo, video and/or personalized text entries immediately as the photo, video and/or text entry is made.

It will be apparent to those skilled in the art that various modifications and variations can be made to the structure of the present application without departing from the scope or spirit of the present application. In view of the foregoing, it is intended that the present application cover modifications and variations of this application provided they fall within the scope of the following claims and their equivalents.

The invention claimed is:

1. A method for automatically creating an album in real-time by an application, the application is running on a smartphone, within the smartphone's camera screen, the method comprising:
   selecting the album in the application;
   inviting at least one additional edit and contributing member from a mobile contact list;
   entering a camera mode in the application includes a text journal bar shown within the camera mode, then start capturing process for at least one media;
   texting in the text journal bar before capturing of at least one media if needed, and the at least one additional edit and contributing member is also able to text in the text journal bar before capturing of the at least one media;
   capturing the at least one media via the application;
   showing the at least one media with text entries, if any, by the application; and
   automatically populating the at least one media chronologically directly into the album in real time, alongside other captured photos and videos;
   wherein the text journal bar will be shown on the screen as long as the application is in the camera mode;
   wherein a plurality of sub-albums is created according to a location of the at least one additional edit and contributing member.

2. The method for automatically creating the album by the application as claimed in claim 1, wherein the step of selecting the album in the application comprises creating the album.

3. The method for automatically creating the album by the application as claimed in claim 2, wherein the step of creating the album comprises selecting an album template.

4. The method for automatically creating the album by the application as claimed in claim 2, wherein the step of creating the album comprises titling the album.

5. The method for automatically creating the album by the application as claimed in claim 1, wherein the step of selecting the album in the application comprises selecting an existing album in an applications library.

6. The method for automatically creating the album by the application as claimed in claim 1, wherein the at least one additional edit member can contribute alongside the original user, at the same time, contributing to the album together.

7. The method for automatically creating the album by the application as claimed in claim 1, wherein the step of capturing the at least one media via the application comprises capturing a photo, taking a video or recording via the application.

8. The method for automatically creating the album by the application as claimed in claim 1, wherein after automatically populating the at least one media in the album, the method further comprises storing the album on a storage library media, and the album includes photos, videos, and text entries.

9. The method for automatically creating the album by the application as claimed in claim 1, wherein after the step of automatically populating the at least one media in the album, the method further comprises sending an alert when the at least one media reaches a minimum amount.

10. The method for automatically creating the album by the application as claimed in claim 9, wherein after the step of sending the alert when the at least one media reaches the minimum amount, the method further comprises creating at least one physical copy of the album and storing one digital album within an application library in the application.

11. The method for automatically creating the album by the application as claimed in claim 10, wherein the at least one physical copy of the album contains the at least one media and the text entries.

12. The method for automatically creating the album by the application as claimed in claim 10, wherein before the step of creating at least one physical copy of the album, the method further comprises the ability of selecting at least one additional sharing member.

13. The method for automatically creating the album by the application as claimed in claim 10, wherein the step of creating at least one physical copy of the album comprises creating a digital album, wherein the digital album contains the at least one media of photo, video, and the text entries.

14. The method for automatically creating the album by the application as claimed in claim 9, wherein the step of sending the alert when the at least one media reaches the minimum amount comprises sending the alert when the at least one media reaches 300 pages.

15. The method for automatically creating the album by the application as claimed in claim 1, wherein after the step of automatically populating the at least one media in the album, the method further comprises sending an alert when the album is full.

16. The method for automatically creating the album by the application as, claimed in claim 1, wherein after the step of automatically populating the at least one media in the album, the method further comprises reviewing the album.

17. A system for automatically populating media chronologically directly into an album in the system, the system is running on a smartphone with a screen, the system comprising:
   a processor configured to:
      selecting the album in the library of the application;
      inviting at least one additional edit and contributing member from a mobile contact list;
      entering camera mode in the application where a text journal bar shown alongside phone's photo and video capturing function within the camera mode to start a capturing process for at least one media alongside each other photos and videos;
      texting in the text journal bar before captured the at least one media if needed, and the at least one additional edit and contributing member is also able to text in the text journal bar before capturing of the at least one media;
      capturing the at least one media via the application;
      showing the at least one media with text entries, if any, by the application; and
      automatically populating the at least one media chronologically directly into the album in real time, alongside photo and video entries;
      wherein the text journal bar will be shown on the screen as long as the application is in the camera mode;
      wherein a plurality of sub-albums is created according to a location of the at least one additional edit and contributing member.

* * * * *